United States Patent
Hafeez

(10) Patent No.: US 12,464,507 B2
(45) Date of Patent: Nov. 4, 2025

(54) PROTECTING INCUMBENT SYSTEMS USING SPECTRUM NOTCHING

(71) Applicant: Charter Communications Operating, LLC, St. Louis, MO (US)

(72) Inventor: Abdulrauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 342 days.

(21) Appl. No.: 18/328,224

(22) Filed: Jun. 2, 2023

(65) Prior Publication Data

US 2024/0406942 A1    Dec. 5, 2024

(51) Int. Cl.
*H04W 72/04*     (2023.01)
*H04W 16/14*     (2009.01)
*H04W 72/0453*   (2023.01)

(52) U.S. Cl.
CPC ....... *H04W 72/0453* (2013.01); *H04W 16/14* (2013.01)

(58) Field of Classification Search
CPC .......... H04W 72/0453; H04W 16/14
See application file for complete search history.

(56) References Cited

U.S. PATENT DOCUMENTS

| 8,509,158 B2 * | 8/2013 | Norin | H04W 16/14 370/344 |
| --- | --- | --- | --- |
| 2019/0394790 A1 | 12/2019 | Damnjanovic et al. | |
| 2021/0153029 A1 | 5/2021 | Mueck et al. | |
| 2022/0053336 A1 | 2/2022 | Taneja et al. | |

FOREIGN PATENT DOCUMENTS

KR    10-2021-0099591    8/2021

OTHER PUBLICATIONS

"Adjacent Channel Co-Existence Use-Case of Non-Overlapping Sub Band Full Duplex (SBFD) between n48 and n77", Charter Communications Inc., Cable Labs, R4-2300145, 3GPP TSG RAN WG4, Meeting # 106, Athens, Greece, Feb. 16, 2023, 4 pages.
International Search Report and Written Opinion for International Patent Application No. PCT/US2024/030520, dated Sep. 9, 2024, 8 pages.

(Continued)

*Primary Examiner* — Curtis B Odom
(74) *Attorney, Agent, or Firm* — Dority & Manning, P.A.

(57) ABSTRACT

Methods to protect incumbent communications in a shared band (e.g., shared by incumbents and shared band devices), are provided. In one example, a method includes receiving information, by a spectrum access controller (SAC) associated with a shared band, indicating usage of a sub-portion of a channel in the shared band. The method includes receiving, by the SAC, information associated with one or more shared band devices (SBDs) with spectrum notching capability (SNC) to reduce interference in the sub portion of the channel being used by the incumbent. The method includes determining, by the SAC, spectrum access information (SAI) for the one or more SBDs based at least in part on the SNC of the one or more SBDs. The method includes transmitting, from the SAC, SAI to the one or more SBDs, and SBDs accessing the channel according to the SAI.

20 Claims, 5 Drawing Sheets

(56) References Cited

OTHER PUBLICATIONS

Author Unknown, "Spectrum Sharing Committee Work Group 3 (CBRS Protocols)," SAS-CBSD TS, WINNF-TS-0016-V1.2.7, Wireless Innovation Forum, Mar. 21, 2022, 60 pages.
Author Unknown, "3.5 GHZ Band Overview," United States Federal Communications Commission, https://www.fcc.gov/wireless/bureau-divisions/mobility-division/35-ghz-band/35-ghz-band-overview, Apr. 3, 2023, 5 pages.

* cited by examiner

PROTECTING INCUMBENT SYSTEMS USING SPECTRUM NOTCHING

BACKGROUND

Communication systems may include shared communication bands where certain devices have to protect or share spectrum with a high priority device. In Federal Communications Commission (FCC) Auction 105-3.5 GHZ, several companies were awarded 10 MHz Priority Access Licenses (PAL) on a per county basis in the lower 100 MHz Citizens Broadband Radio Service (CBRS) band. The CBRS band is a 150 MHz wide broadcast band of the 3.5 GHz band from 3550 MHz to 3700 MHZ. PAL users may be required to protect higher-tier (incumbent) users.

SUMMARY

Example aspects of the present disclosure are directed to systems and methods for spectrum notching (e.g., Physical Resource Block (PRB) blanking and/or preamble puncturing) that allow one or more shared band devices (SBDs) to selectively avoid interference with incumbents in a shared band (e.g., the CBRS band).

In one embodiment, a method is provided. The method includes receiving, by a spectrum access controller associated with a shared band having an incumbent and one or more shared band devices (SBDs), incumbent information associated with the incumbent. The method includes receiving, by the spectrum access controller, information associated with one or more SBDs with spectrum notching capability (SNC). The method includes determining, by the spectrum access controller, spectrum access information for the one or more SBDs based at least in part on the SNC of the one or more SBDs. The method includes transmitting, from the spectrum access controller, spectrum access information to the one or more SBDs.

In another embodiment, a method is provided. The method includes transmitting, from a shared band device (SBD), spectrum notching capability (SNC) in the shared band to a spectrum access controller. The method includes receiving, by the SBD, spectrum access information from the spectrum access controller. The spectrum access information is determined based at least in part on the SNC of the SBD to mitigate interference to an incumbent.

In another embodiment, a spectrum access controller is provided. The spectrum access controller includes a memory. The spectrum access controller includes a processor device coupled to the memory and operable to: receive incumbent information associated with an incumbent; receive information associated with one or more SBDs with spectrum notching capability (SNC); determine spectrum access information for the one or more SBDs based at least in part on the SNC of the one or more SBDs; and transmit spectrum access information to the one or more SBDs.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
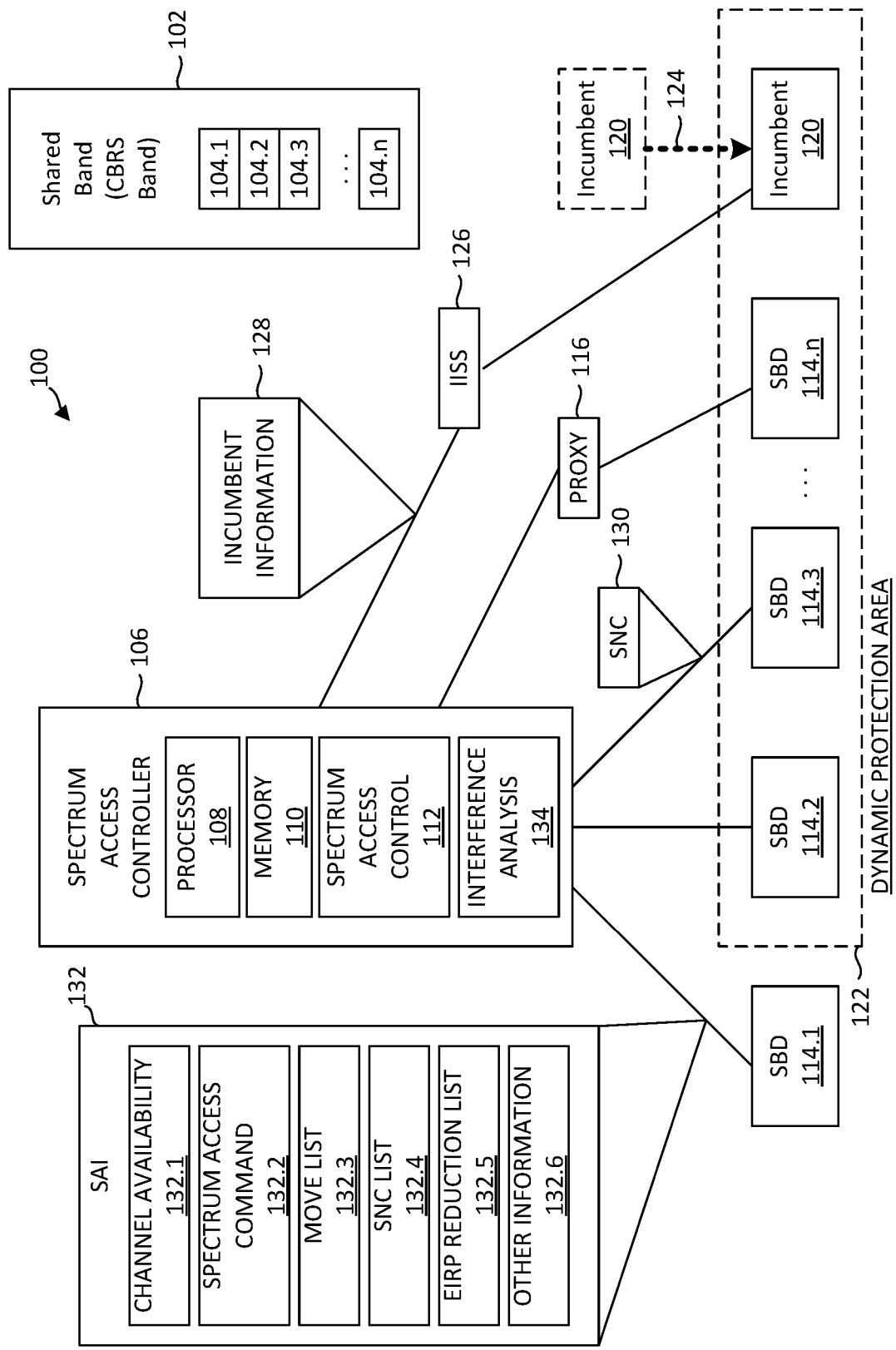
FIG. 1 is a block diagram of an example system according to example embodiments of the present disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Communication systems may require devices to communicate over a shared band. For example, the FCC has awarded several companies with 10 MHz Priority Access Licenses (PAL) on a per county basis in the lower 100 MHz Citizens Broadband Radio Service (CBRS) band. PAL users are required to protect higher-tier (incumbent) users at all times. For instance, in a situation where incumbent activity is detected in a Dynamic Protection Area (DPA) (e.g., a US naval aircraft carrier approaching the US shoreline), any operating PAL Citizens Broadband radio Service Devices (CSBDs) operating in channel(s) used by the incumbent must vacate the entire channel(s) used by the incumbent if and when indicated by the Spectrum Access Controller (SAC).

Aspects of the present disclosure are discussed with reference to a shared band that is the CBRS band for purposes of illustration and discussion. The SBDs may be Citizens Broadband radio Service Devices (CBSD) s. Those of ordinary skill in the art, using the disclosures provided herein, will understand that aspects of the present disclosure are applicable to other shared bands without deviating from the scope of the present disclosure.

PAL SBDs may operate in one or more of 10 channels (e.g., spanning 10 MHz each) in the lower 100 MHz of the CBRS band. Currently, when incumbent (higher tier) activity is detected, an entire 10 MHz CBRS channel must be cleared. Many incumbents (e.g., Navy shipborne radars) in use today are of type SPN43 which operate in only 1.6 MHz bandwidth. However, an incumbent such as a shipborne radar may impact two contiguous channels, making 20 MHz of CBRS spectrum unavailable for potentially days at a time.

Based on the knowledge of all SBD locations and granted powers in the DPA, a SAC may compute a list of channel grants for each of the 10 channels in the CBRS band which would have to be suspended if the DPA becomes activated. This list of channels may indicate which SBDs must move to different channels. This list may be referred to as a move list. A SAC may also facilitate SBDs on the move list to find alternate channels in the CBRS band, if available, to continue operations. However, the process may be disruptive to PAL network operations and PAL users may face increased interference or outage while the incumbent is in the DPA.

Spectrum notching may be used to blank out or notch communication over certain frequencies in a channel or band. For instance, cellular systems (e.g., 4G and 5G cellular systems) have the capability to selectively blank out transmissions over parts of the time-frequency resources, known as Physical Resource Blocks (PRB) Blanking. Preamble puncturing is another techniques that may be used to selectively notch frequencies in a frequency band, such as a shared band. The solutions described herein allow SBDs to use spectrum notching capability (SNC) to selectively avoid interference to the incumbent in the small portion of the spectrum it needs, while utilizing the rest of the spectrum for commercial use. Spectrum notching may be used to selectively disable certain frequencies during communication by a device on a channel.

More particularly, in some examples, an SAC may obtain incumbent spectrum usage information indicative of which part of a frequency band or channel is needed for incumbent use. The information may be obtained, for instance, from an incumbent informing or sensing system (IISS). The SAC may obtain information about which SBDs may have SNC, such as PRB blanking capability (PNC) or preamble puncturing capability (PPC). Based on this information, the SAC may perform an interference analysis (e.g., known effective isotropic radiated power (EIRP reduction) or other power reduction in the frequency band or channel used by the incumbent) based on the SNC and may communicate spectrum access information to the SBDs. The spectrum access information may indicate how the SBDs may communicate on the channel(s) of the shared band (e.g., with spectrum notching) while protecting portions of the shared band spectrum used by the incumbent.

FIG. 1 is a block diagram of a system 100 in which incumbent communications in a shared band 102 (e.g., CBRS band) may be protected using spectrum notching. A representation of the shared band 102 is provided in FIG. 1. In some examples, the shared band is the CBRS band and may span from about 3550 MHz to about 3700 MHz. The shared band 102 may include a plurality of channels 104.1, 104.2, 104.3, . . . 104.n (e.g., 10 MHz channels). In some examples, PALs may have been granted for the channels (e.g., 10 channels) in the lower 100 MHz of the shared band 102.

The system 100 includes an SAC 106. The SAC 106 may include a processor device 108 coupled to a memory 110. The SAC 106 facilitates the management of radio frequency spectrum in the shared band and coordinates the allocation of available spectrum resources. For instance, the SAC 106 may implement a spectrum access control module 112 (e.g., software implemented by the processor device 108 coupled to the memory 110) to provide any of the functionality of the SAC 106 described herein. Because the spectrum access control module 112 is a component of the SAC 106, functionality implemented by the spectrum access control module 112 may be attributed to the SAC 106 generally. Moreover, in examples where the spectrum access control module 112 comprises software instructions that program the processor device 108 to carry out functionality discussed herein, functionality implemented by the spectrum access control module 112 may be attributed herein to the processor device 108.

The SAC 106 may be in communication with one or more SBDs 114.1, 114.2, 114.3, . . . 114.n. The SBDs may be, in some examples, Citizens Broadband radio Service Devices (CSBDs). The SAC 106 may be in direct communication with the SBDs 114.1, 114.2, 114.3, . . . 114.n or may communicate with the SBDs 114.1, 114.2, 114.3, . . . 114.n through one or more proxies, such as proxy 116. Proxy 116 may be, for instance, a different SAC in the system 100.

Each SBD 114.1, 114.2, 114.3, . . . 114.n may be operable to communicate information on one or more channels 104.1, 104.2, 104.3, . . . 104.n in the shared band 102. SBDs 114.1, 114.2, 114.3, . . . 114.n may include various types of wireless devices, such as end-user devices, access points, base station equipment and other wireless communication equipment. For instance, each SBD 114.1, 114.2, 114.3, . . . 114.n may be, in some examples, an operating Priority Access Licensee (PAL) CBSD in the CBRS band.

An incumbent 120 (e.g., Navy shipborne radar) may operate in the shared band 102. The incumbent 120 may operate on one or more channels 104.1, 104.2, 104.3, . . . 104.n in the shared band 102. The incumbent 120 may move into a dynamic protection area (DPA) 122 as indicated by arrow 124. For instance, a Navy ship may move to a coastline.

The SAC 106 may be operable to protect communications in the shared band 102 for the incumbent 120 when the incumbent is in the DPA 122. For instance, SAC 106 may reserve certain channel(s) 104.1, 104.2, 104.3, . . . 104.n in the shared band 102 for communication by the incumbent 120 and may require one or more SBD(s) 114.1, 114.2, 114.3, . . . 114.n communicating on channel(s) 104.1, 104.2, 104.3, . . . 104.n used by the incumbent 120 to move to different channel(s) 104.1, 104.2, 104.3, . . . 104.n in the shared band 102.

As illustrated in FIG. 1, the one or more SBDs 114.1, 114.2, 114.3, . . . 114.n may or may not be in the DPA 122. In some examples, the one or more SBDs 114.1, 114.2, 114.3, . . . 114.n may be in an exclusion zone associated with the incumbent moving into the DPA 122. The exclusion zone may be a region within or near the DPA where there can be no interference with an incumbent 120 on a channel used by the incumbent 120. In some examples, the one or more SBDs 114.1, 114.2, 114.3, . . . 114.n may be in a whisper zone or quiet zone associated with the incumbent moving into the DPA 122. The whisper zone or quiet zone may be a region within or near the DPA 122. In a whisper zone or quiet zone, the potential interference with an incumbent 120 on a channel used by the incumbent 120 must be less than some interference protection threshold. The exclusion zone, whisper zone, quiet zone determinations may be performed by the SAC 106.

The SAC 106 may include and/or may be in communication with an incumbent informing or sensing system (IISS) 126. The SAC 106 may receive incumbent information 128 from the IISS 126. The incumbent information 128 may be associated with the incumbent 120 moving into the DPA 122. The incumbent information 128 may include, for instance, incumbent spectrum usage information indicative of which sub-portion (e.g., 1.6 MHz portion) of a frequency band or channel(s) 104.1, 104.2, 104.3, . . . 104.n in the shared band 102 that is needed for the incumbent 120 to use in the DPA 122. Incumbent information 128 may provide the location and protection parameters of the incumbent 120 for use by the SAC 106 in determining spectrum access information and for determining, for instance, an exclusion zone, a whisper zone, and/or a quiet zone.

In some examples, the IISS 126 may determine the incumbent information 128 by either a sensing result (e.g., sensing incumbent usage in the frequency band or channel(s)) or by reservation information (e.g., reserved channels for incumbents) specified by an operator. The IISS 126 may also determine the time an incumbent 120 becomes active in a geographical location (e.g., enters the DPA 122) and the part of frequency band or channel(s) used by the incumbent 120.

The SAC 106 may also receive information associated with one or more SBDs 114.1, 114.2, 114.3, . . . 114.n. The information associated with the SBDs 114.1, 114.2, 114.3, . . . 114.n may include, for instance, geographic locations of the SBDs 114.1, 114.2, 114.3, . . . 114.n. The SAC 106 may receive the information either directly from the SBDs 114.1, 114.2, 114.3, . . . 114.n or the proxy(s) 116 of the SBDs 114.1, 114.2, 114.3, . . . 114.n.

According to example embodiments of the present disclosure, the SAC 106 may receive information associated with one or more SBDs 114.1, 114.2, 114.3, . . . 114.n having spectrum notching capability (SNC) 130. SNC may include, for instance, blocking or notching frequencies associated with at least a sub-portion of frequencies used in the shared band 102. SNC may include, for instance, physical resource block (PRB) blanking capability (PBC), preamble puncturing capability (PPC), or other similar capability. Spectrum notching may be used to selectively disable frequencies during communication by a SBD 114.1, 114.2, 114.3, . . . 114.n on a channel 104.1, 104.2, 104.3, . . . 104.n. The SNC information 130 may include data indicating that a SBD 114.1, 114.2, 114.3, . . . 114.n can blank transmissions in a sub-portion of the frequency bands or channel(s) 104.1, 104.2, 104.3, . . . 104.n in the shared band 102, such as the sub-portion of the frequency band(s) or channel(s) 104.1, 104.2, 104.3, . . . 104.n used by the incumbent 120.

With the knowledge of incumbent information 128 and the SNC information 130, the SAC 106 may determine spectrum access information (SAI) 132 based at least in part on the SNC information 130. The SAC 106 may transmit the SAI 132 to one or more of the SBDs 114.1, 114.2, 114.3, . . . 114.n to control communications on the shared band 102. The SAI 132 may include frequency band or channels(s) availability 132.1, a spectrum access command 132.2, a move list 132.3, a spectrum notching list 132.4, effective isotropic radiated power (EIRP) reduction 132.5, and other information 132.6.

The SAI 132 is determined by the SAC 106 by conducting an interference analysis 134. In some examples, the interference analysis 134 may be based at least in part on a known EIRP reduction in the frequency band or channel(s) due to spectrum notching by the SBDs 114.1, 114.2, 114.3, . . . 114.n. The EIRP for the SBDs 114.1, 114.2, 114.3, . . . 114.n in the channel 104.1, 104.2, 104.3, . . . 104.n may be compared to an interference protection threshold. If the EIRP meets the interference protection threshold, one or more of the SBDs 114.1, 114.2, 114.3, . . . 114.n may communicate on the same channel 104.1, 104.2, 104.3, . . . 104.n used by the incumbent 120 provided that the SBDs 114.1, 114.2, 114.3, . . . 114.n implements spectrum notching for the sub-portion (e.g., 1.6 MHZ) of the channel 104.1, 104.2, 104.3, . . . 104.n used by the incumbent.

More particularly, in some examples, when determining a potential interference for SBD 114.1, 114.2, 114.3, . . . 114.n with an incumbent 120, the SAC 106 may reduce the EIRP for the SBD 114.1, 114.2, 114.3, . . . 114.n by some X dB level (e.g., 25 dB) to take into account SNC of the SBD 114.1, 114.2, 114.3, . . . 114.n over the sub-portion of the channel(s) 104.1, 104.2, 104.3, . . . 104.n used by the incumbent 120. The SAC 106 will then determine whether interference contribution by the SBD 114.1, 114.2, 114.3, . . . 114.n exceeds a protection threshold for the incumbent 120. For an incumbent 120 requiring aggregate protection, the SAC 106 may aggregate potential interference from multiple SBDs 114.1, 114.2, 114.3, . . . 114.n with and without SNC.

For an incumbent 120 requiring static protection, the SAC 106 may transmit SAI 132 including a spectrum access command 132.2 of Grant Reject; Grant Accept; Grant Accept with spectrum notching, or Grant Accept with EIRP reduction. Grant Accept indicates that a SBD 114.1, 114.2, 114.3, . . . 114.n must stop transmission on the entire channel(s) 104.1, 104.2, 104.3, . . . 104.n used by the incumbent 120. Grant Accept indicates that a SBD 114.1, 114.2, 114.3, . . . 114.n may use the channel(s) 104.1, 104.2, 104.3, . . . 104.n used by the incumbent 120, but must use granted EIRP on the channel(s) 104.1, 104.2, 104.3, . . . 104.n. Grant Accept with Spectrum Notching indicates that a SBD 114.1, 114.2, 114.3, . . . 114.n with SNC must use granted EIRP on the channel(s) 104.1, 104.2, 104.3, . . . 104.n and implement spectrum notching on the sub-portion of the channel(s) used by the incumbent 120. Grant Accepts with EIRP reduction indicates that a SBD 114.1, 114.2, 114.3, . . . 114.n may use the channel(s) 104.1, 104.2, 104.3, . . . 104.n, but must implement some EIRP reduction on the entire channel.

For an incumbent 120 requiring dynamic protection, the SAC 106 may determine and transmit SAI 132 that includes a move list 132.3, a spectrum notching list 132.4, and/or an EIRP reduction list 132.5. The move list 132.3 may identify SBDs 114.1, 114.2, 114.3, . . . 114.n that must stop transmission on an entire channel(s) 104.1, 104.2, 104.3, . . . 104.n used by the incumbent 120. The spectrum notching list 132.4 may identify SBDs 114.1, 114.2, 114.3, . . . 114.n that may continue transmission on the channel(s) 104.1, 104.2, 104.3, . . . 104.n used by the incumbent 120, but with PRB implemented over the sub-portions of the channel(s) 104.1, 104.2, 104.3, . . . 104.n used by the incumbent 120. The EIRP reduction list 132.5 may specifying which of the one or more SBDs 114.1, 114.2, 114.3, . . . 114.n are to implement EIRP reduction in an entire channel being used by the incumbent 120.

Figure 2:
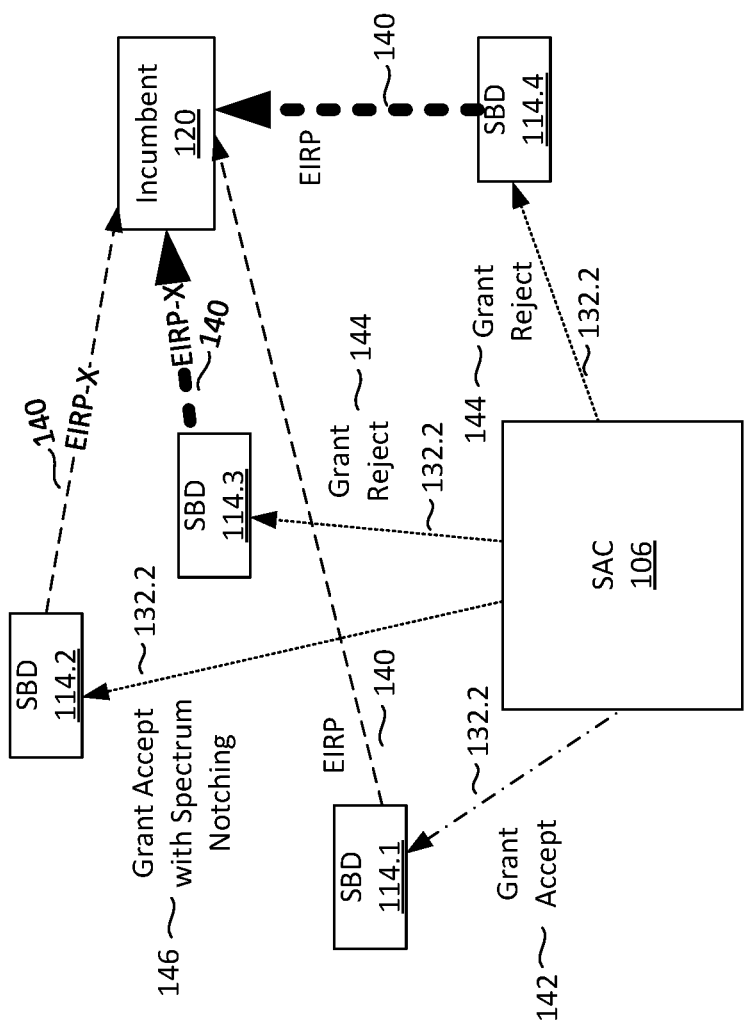
FIG. 2 is a block diagram of example spectrum access control in a system according to example embodiments of the present disclosure.

FIG. 2 depicts one example of an interference analysis that may be conducted by an SAC 106 according to example embodiments of the present disclosure. As shown, the SAC 106 determines interference by the SBDs 114.1, 114.2, 114.3, 114.4 with the incumbent 120. The interference by each respective SBD 114.1, 114.2, 114.3, 114.4 is indicated by an arrow 140 with a thicker arrow indicating higher potential interference with the incumbent (e.g., based on EIRP of the SBDs 114.1, 114.2, 114.3, 114.4 and geographic proximity to the incumbent 120).

More specifically, the SBD 114.1 may not have SNC. In that regard, the SAC 106 determines interference with the incumbent 120 based at least in part on the EIRP of the SBD 114.1 and the geographic proximity to the incumbent 120. Similarly, the SBD 114.4 may not have SNC. In that regard, the SAC 106 determines interference with the incumbent 120 based at least in part on the EIRP of the SBD 114.4 and the geographic proximity to the incumbent 120. Due to the proximity of SBD 114.4 relative to SBD 114.1, the interference by SBD 114.4 is greater than the interference by SBD 114.1.

The SBD 114.2 may have SNC. In that regard, the SAC 106 determines interference with the incumbent 120 based at least in part on an EIRP reduction EIRP-X of the SBD 114.2 and the geographic proximity to the incumbent 120. X may be, for instance, about 25 dB. Similarly, the SBD 114.3 may have SNC. In that regard, the SAC 106 determines interference with the incumbent 120 based at least in part on the EIRP reduction EIRP-X of the SBD 114.3 and the geographic proximity to the incumbent 120. Due to the proximity of SBD 114.3 relative to SBD 114.2, the interference by SBD 114.3 is greater than the interference by SBD 114.2.

The SAC 106 provides spectrum access commands 132.2 to each of the SBDs 114.1, 114.2, 114.3, 114.4. In particular, the SAC 106 provides a Grant Accept command 142 to SBD 114.1. The SAC 106 provides Grant Reject commands 144 to SBD 114.3 and 114.4. The SAC 106 provides a Grant Accept with PRB Blanking command 146 to SBD 142.2.

Figure 3:
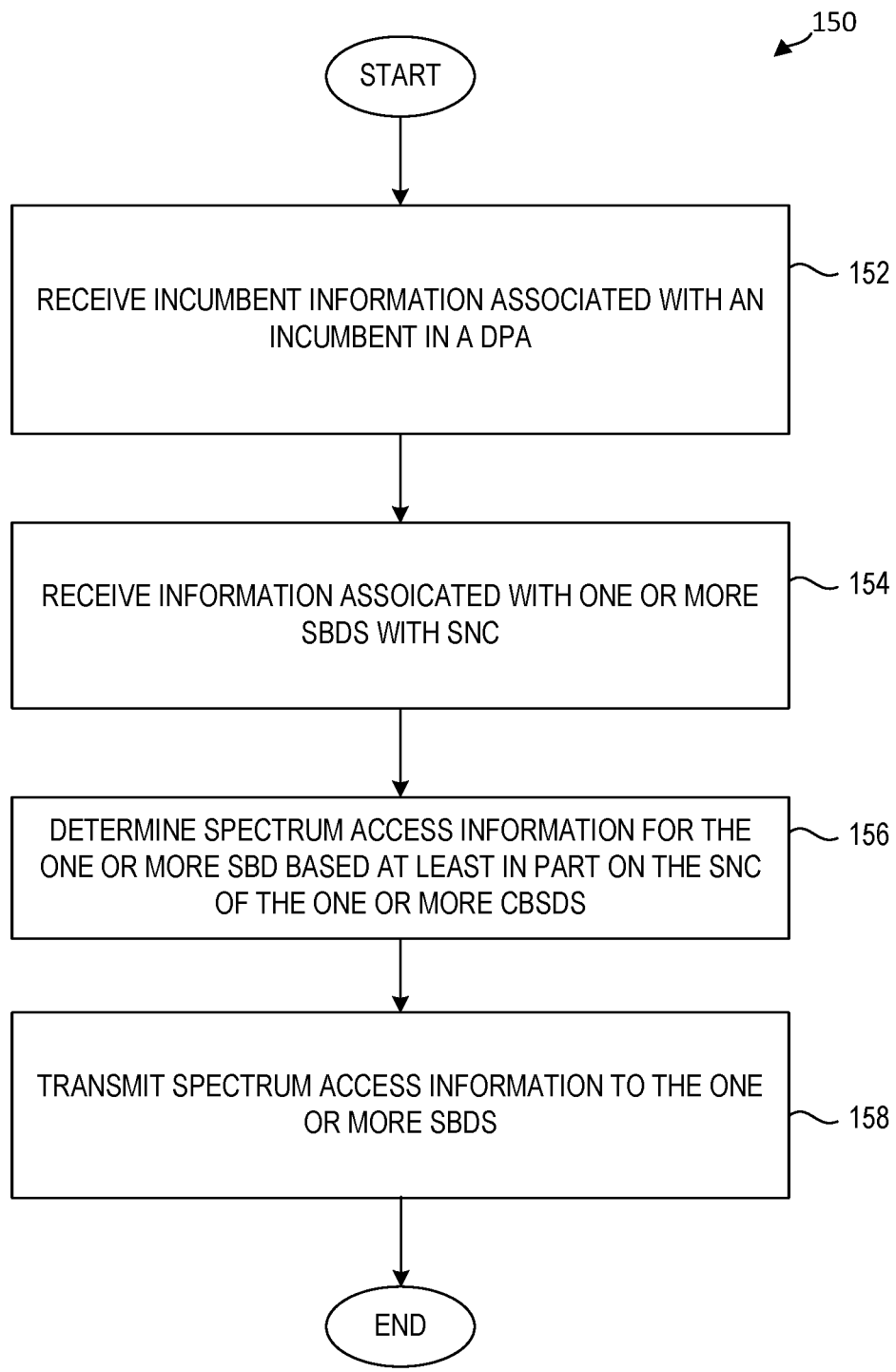
FIG. 3 is a flowchart of an example method according to example embodiments of the present disclosure.

FIG. 3 is a flowchart of an example method 150 according to example embodiments of the present disclosure. The method 150 of FIG. 3 may be implemented by a spectrum access controller, such as SAC 106 of FIG. 1. FIG. 3 depicts example process steps for purposes of illustration and discussion. Those of ordinary skill in the art, using the disclosures provided herein, will understand that process steps of any of the methods described in the present disclosure may be adapted, modified, include steps not illustrated, omitted, and/or rearranged without deviating from the scope of the present disclosure.

The SAC 106 receives incumbent information 128 associated with an incumbent 120 in a DPA 122 (FIG. 3 block 152). For instance, the SAC 106 may receive information about a sub-portion of a frequency band and/or channel(s) 104.1, 104.2, 104.3, . . . 104.*b* used by the incumbent 120 in the shared band 102.

The SAC 106 receives SNC information 130 associated with one or more SBDs 114.1, 114.2, 114.3, . . . 114.*n* (FIG. 3 block 154). The SNC information 130 may include data indicating that a SBD 114.1, 114.2, 114.3, . . . 114.*n* can blank transmissions (e.g., using PRB blanking, preamble puncturing, or similar) associated with a sub-portion of the frequency bands or channel(s) 104.1, 104.2, 104.3, . . . 104.*n* in the shared band 102, such as the sub-portion of the frequency band(s) or channel(s) 104.1, 104.2, 104.3, . . . 104.*n* used by the incumbent 120.

The SAC 106 determines SAI 132 based at least in part on the SNC information 130 associated with the one or more SBDs 114.1, 114.2, 114.3, . . . 114.*n* (FIG. 3 block 156). The SAI 132 may include, for instance, frequency band or channels(s) availability 132.1, a spectrum access command 132.2, a move list 132.3, a spectrum notching list 132.4, an effective isotropic radiated power (EIRP) reduction list 132.5, and other information 132.6. In some embodiments, the SAC 106 may determine the SAI 132 based on an interference analysis as described with reference to FIGS. 1 and 2.

The SAC 106 transmits, after determination, the spectrum access information 130 to the one or more SBDs (FIG. 3 block 158). For instance, for an incumbent 120 requiring static protection, the SAC 106 may transmit SAI 132 including a spectrum access command 132.2 of Grant Reject; Grant Accept; or Grant Accept with Spectrum Notching. For an incumbent 120 requiring dynamic protection, the SAC 106 may determine and transmit SAI 132 that includes a move list 132.3 and a spectrum notching list 132.4.

Figure 4:
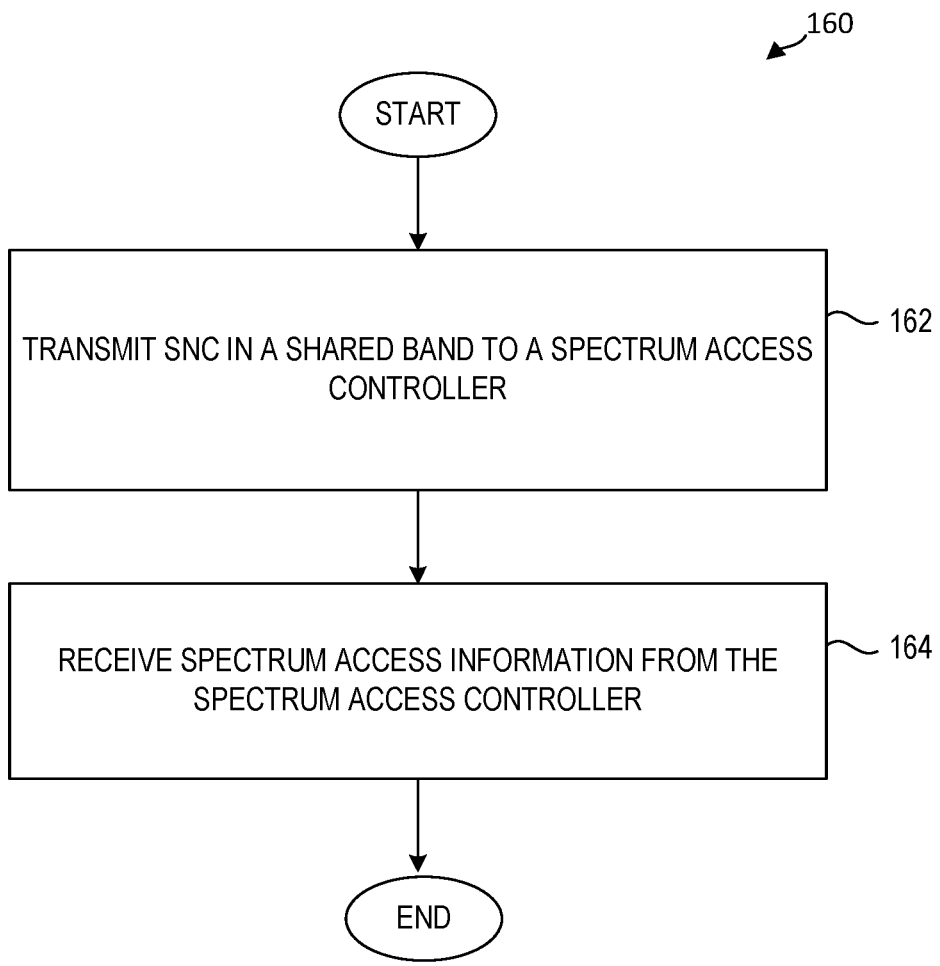
FIG. 4 is a flowchart of an example method according to example embodiments of the present disclosure.

FIG. 4 is a flowchart of an example method 160 according to example embodiments of the present disclosure. The method 160 may be implemented by SBD, such as one of SBD 114.1, 114, 2, 114.3, . . . 114.*n*. FIG. 4 depicts example process steps for purposes of illustration and discussion. Those of ordinary skill in the art, using the disclosures provided herein, will understand that process steps of any of the methods described in the present disclosure may be adapted, modified, include steps not illustrated, omitted, and/or rearranged without deviating from the scope of the present disclosure.

A SBD 114.1, 114.2, 114.3, . . . 114.*n* may transmit its SNC information 130 to an SAC 106 (FIG. 4 block 162). The SNC information 130 may include data indicating that a SBD 114.1, 114.2, 114.3, . . . 114.*n* can blank transmissions (e.g., using PRB blanking, preamble puncturing, or similar) associated with a sub-portion of the frequency bands or channel(s) 104.1, 104.2, 104.3, . . . 104.*n* in the shared band 102, such as the sub-portion of the frequency band(s) or channel(s) 104.1, 104.2, 104.3, . . . 104.*n* used by the incumbent 120.

The SBD 114.1, 114.2, 114.3, . . . 114.*n* may receive SAI 132 from the SAC 106 in response to transmitting its SNC information 130 (FIG. 4 block 164). The SAI 132 may be determined based at least in part on the SNC information 130. For instance, for an incumbent 120 requiring static protection, the SBD 114.1, 114.2, 114.3, . . . 114.*n* may receive SAI 132 including a spectrum access command 132.2 of Grant Reject; Grant Accept; Grant Accept with Spectrum Notching, or Grant Accept with EIRP reduction. When the spectrum access command 132.2 is Grant Accept, the SBD 114.1, 114.2, 114.3, . . . 114.*n* transmits in a channel 104.1, 104.2, 104.3, . . . 114.*n* used by the incumbent 120 in the shared band 102. When the spectrum access command 132.2 is Grant Reject, the SBD 114.1, 114.2, 114.3, . . . 114.*n* stops transmitting in a channel 104.1, 104.2, 104.3, . . . 104.*n* used by the incumbent 120 in the shared band 102. When the spectrum access command 132.2 is Grant Accept with Spectrum Notching, the SBD 114.1, 114.2, 114.3, . . . 114.*n* transmits in a channel 104.1, 104.2, 104.3, . . . 104.*n* used by the incumbent 120 in the shared band 102 with spectrum notching in a sub-portion of a channel 104.1, 104.2, 104.3, . . . 104.*n* used by the incumbent 120. For an incumbent 120 requiring dynamic protection, the SBD 114.1, 114.2, 114.3, . . . 114.*n* may receive SAI 132 and transmit SAI 130 that includes a move list 132.3 and a spectrum notching list 132.4.

Figure 5:
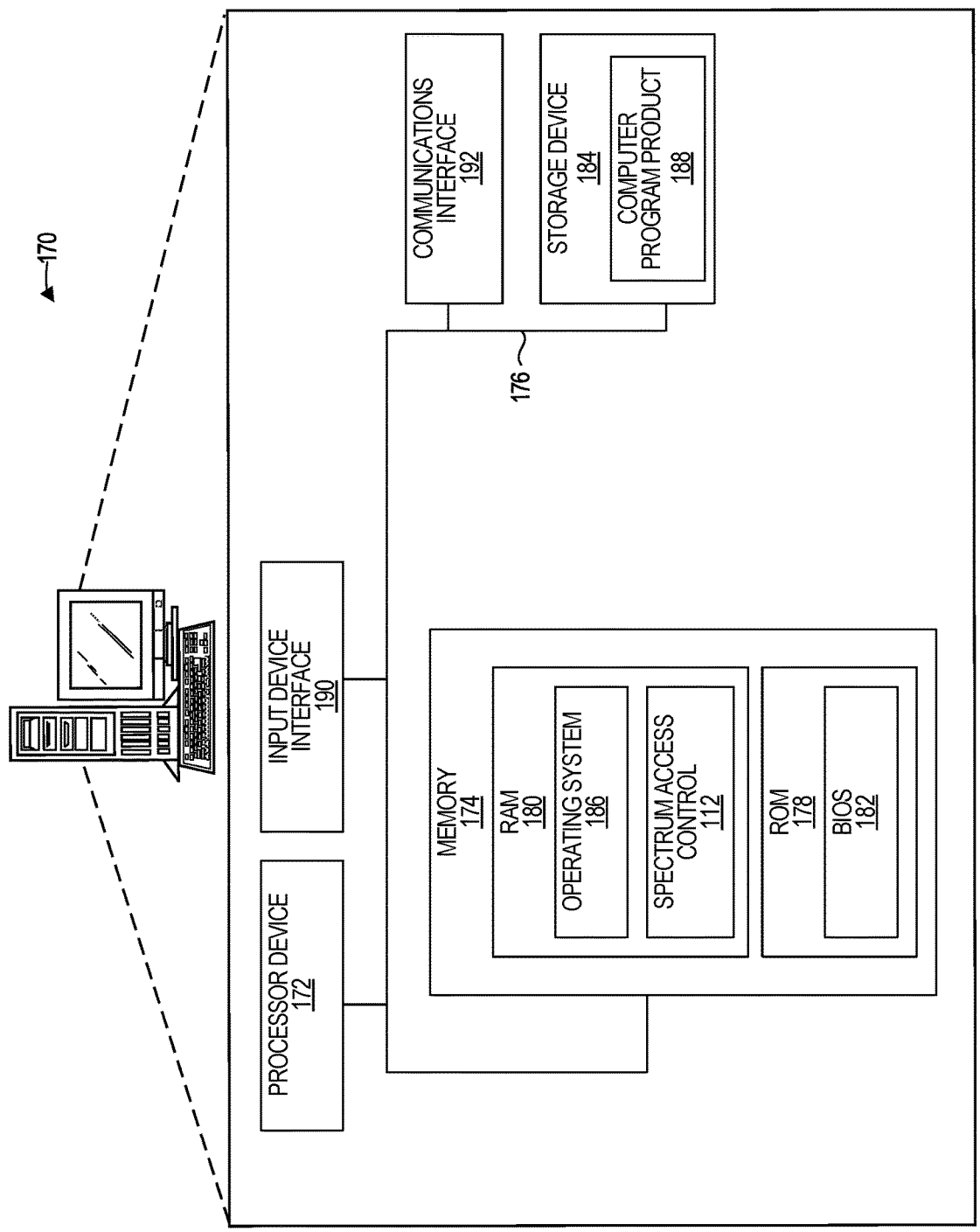
FIG. 5 is a block diagram of the computing system suitable for implementing examples according to one example.

FIG. 5 is a block diagram of the computing device 170 that can serve as a system access controller (e.g., SAC 106) according to one example. The computing device 170 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 170 includes the processor device 172, the system memory 174, and a system bus 176. The system bus 176 provides an interface for system components including, but not limited to, the system memory 174 and the processor device 172. The processor device 172 can be any commercially available or proprietary processor.

The system bus 176 may be any of several types of bus structures that may further interconnect to a memory bus (with or without a memory controller), a peripheral bus, and/or a local bus using any of a variety of commercially available bus architectures. The system memory 174 may include non-volatile memory 178 (e.g., read-only memory (ROM), erasable programmable read-only memory (EPROM), electrically erasable programmable read-only memory (EEPROM), etc.), and volatile memory 180 (e.g., random-access memory (RAM)). A basic input/output system (BIOS) 182 may be stored in the non-volatile memory 178 and can include the basic routines that help to transfer information between elements within the computing device 170. The volatile memory 180 may also include a high-speed RAM, such as static RAM, for caching data.

The computing device 170 may further include or be coupled to a non-transitory computer-readable storage medium such as the storage device 184, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like.

A number of modules can be stored in the storage device 184 and in the volatile memory 180, including an operating system 186 and one or more program modules, such as the spectrum access control module 112, which may implement the functionality described herein in whole or in part. All or a portion of the examples may be implemented as a computer program product 188 stored on a transitory or non-transitory computer-usable or computer-readable storage medium, such as the storage device 184, which includes complex programming instructions, such as complex computer-readable program code, to cause the processor device 172 to carry out the steps described herein. Thus, the computer-readable program code can comprise software instructions for implementing the functionality of the examples described herein when executed on the processor device 172. The processor device 172, in conjunction with the spectrum access control module 112 in the volatile memory 180, may serve as a controller, or control system, for the computing device 170 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 172 through an input device interface 190 that is coupled to the system bus 176 but can be connected by other interfaces such as a parallel port, an Institute of Electrical and Electronic Engineers (IEEE) 1394 serial port, a Universal Serial Bus (USB) port, an IR interface, and the like. The computing device 170 may also include the communications interface 192 suitable for communicating with a network and/or one or more SBD devices and other devices shown in FIG. 1 as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:
receiving, by a spectrum access controller associated with a shared band, the shared band being used by an incumbent and one or more shared band device (SBDs), incumbent information associated with the incumbent;
receiving, by the spectrum access controller, information associated with one or more SBDs with spectrum notching capability (SNC);
determining, by the spectrum access controller, spectrum access information for the one or more SBDs based at least in part on the SNC of the one or more SBDs; and
transmitting, from the spectrum access controller, spectrum access information to the one or more SBDs.

2. The method of claim 1, wherein the incumbent information comprises incumbent spectrum usage information indicating a sub-portion of a channel in the shared band being used by the incumbent.

3. The method of claim 2, wherein the SBDs with SNC are operable to notch one or more frequencies in the sub-portion of the channel used by the incumbent using physical resource block (PRB) blanking.

4. The method of claim 2, wherein the SBDs with SNC are operable to notch one or more frequencies in the sub-portion of the channel used by the incumbent using preamble puncturing.

5. The method of claim 1, wherein the spectrum access controller receives the information associated with one or more SBDs with SNC directly from the one or more SBDs or receives the information associated with one or more SBDs with SNC from a proxy of the one or more SBDs.

6. The method of claim 1, wherein determining, by the spectrum access controller, spectrum access information for the one or more SBDs based at least in part on the SNC of the one or more SBDs comprises conducting an interference analysis, the interference analysis comprising comparing an interference in a channel being used by the incumbent when spectrum notching is implemented for the one or more SBDs to an interference protection threshold.

7. The method of claim 6, wherein the interference analysis is performed based at least in part on a known effective isotropic radiated power (EIRP) reduction in at least a sub-portion of the channel being used by the incumbent when spectrum notching is implemented by the one or more SBDs.

8. The method of claim 6, wherein the spectrum access controller determines a move list of SBDs according to the interference analysis, the move list specifying which of the one or more SBDs are to move off of or not use the channel being used by the incumbent.

9. The method of claim 6, wherein the spectrum access controller determines a spectrum notching list of SBDs, the spectrum notching list specifying which of the one or more SBDs are to implement spectrum notching.

10. The method of claim 6, wherein the spectrum access controller determines an effective isotropic radiated power (EIRP) reduction list of SBDs, the EIRP reduction list specifying which of the one or more SBDs are to implement EIRP reduction in an entire channel being used by the incumbent.

11. The method of claim 1, wherein the spectrum access information comprises a spectrum access command for the one or more SBDs, wherein the spectrum access command is one of grant reject, grant accept, grant accept with spectrum notching, or grant accept with effective isotropic radiated power (EIRP) reduction.

12. A method, comprising:
- transmitting, from a shared band device (SBD), spectrum notching capability (SNC) information in a shared band to a spectrum access controller;
- receiving, by the SBD, spectrum access information from the spectrum access controller; and
- wherein the spectrum access information is determined based at least in part on the SNC of the SBD to mitigate interference to an incumbent.

13. The method of claim 12, wherein the spectrum access information comprises an effective isotropic radiated power (EIRP) reduction in at least a sub-portion of a channel used by an incumbent.

14. The method of claim 12, wherein the spectrum access information comprises data associated with at least one of a move list or an effective isotropic radiated power (EIRP) reduction list.

15. The method of claim 12, wherein the spectrum access information comprises data associated with a spectrum notching list.

16. The method of claim 12, wherein the spectrum access information comprises a spectrum access command, the spectrum access command is one of grant reject, grant accept, grant accept with spectrum notching, or grant accept with effective isotropic radiated power (EIRP) reduction.

17. The method of claim 16, wherein when the spectrum access command is grant accept, the SBD transmits in a channel used by the incumbent in the shared band, wherein when the spectrum access command is grant accept with EIRP reduction, the SBD reduces EIRP in the channel used by the incumbent.

18. The method of claim 16, wherein when the spectrum access command is grant reject, the SBD stops transmitting in a channel used by the incumbent in the shared band.

19. The method of claim 16, wherein when the spectrum access command is grant accept with spectrum notching, the SBD transmits in a channel used by the incumbent in the shared band using spectrum notching over at least a sub-portion of the channel used by the incumbent.

20. A spectrum access controller, comprising:
- a memory;
- a processor device coupled to the memory and operable to:
  - receive incumbent information associated with an incumbent;
  - receive information associated with one or more shared band devices (SBD) with spectrum notching capability (SNC);
  - determine spectrum access information for the one or more SBDs based at least in part on the SNC of the one or more SBDs; and
  - transmit spectrum access information to the one or more SBDs.

\* \* \* \* \*